July 7, 1953 J. P. HOGAN 2,644,829
PRECONDITIONING HYDROCARBON SYNTHESIS CATALYST
Filed Dec. 6, 1948
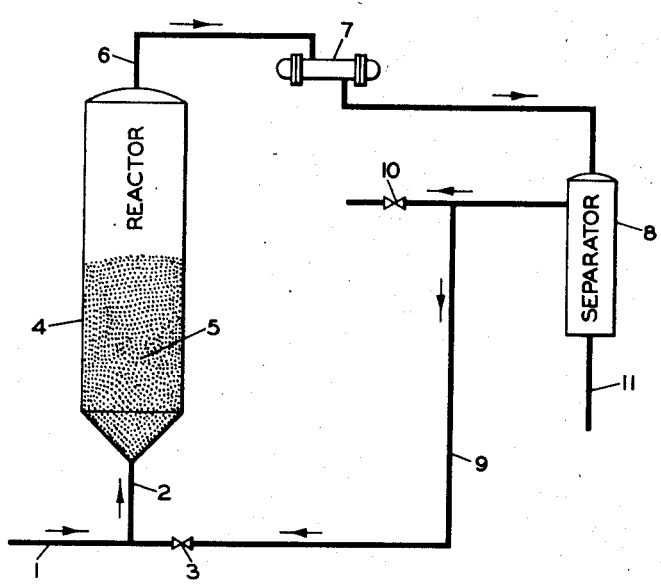
INVENTOR.
J. P. HOGAN
BY Hudson and Young
ATTORNEYS Patented July 7, 1953

2,644,829

UNITED STATES PATENT OFFICE 2,644,829

PRECONDITIONING HYDROCARBON SYNTHESIS CATALYST

John Paul Hogan, Bartlesville, Okla., assignor to Phillips Petroleum Company, a corporation of Delaware Application December 6, 1948, Serial No. 63,678

8 Claims. (Cl. 260—449.6)

This invention relates to the synthesis of organic compounds by the hydrogenation of an oxide of carbon. In a specific aspect this invention relates to a process for the synthesis of normally liquid hydrocarbons and oxygenated derivatives thereof by the catalytic hydrogenation of carbon monoxide. This invention is useful for conditioning catalysts in the initial stages of such processes for the synthesis of hydrocarbons and oxygenated derivatives thereof in which a fresh catalyst is put into use. In a more specific aspect the present invention relates to a method in which such fresh catalysts are "broken in" so as to modify their initial undesirably high activity.

In the synthesis of hydrocarbons and oxygenated derivatives thereof from carbon monoxide and hydrogen by the process now commonly known as the Fischer-Tropsch process, carbon monoxide-hydrogen mixtures are contacted with suitable catalysts at elevated temperatures and pressures to form a mixture of products including normally gaseous and normally liquid as well as solid or waxy materials. Eventually, the catalyst becomes deactivated by the deposition thereon of waxy and/or carbonaceous deposits at which point the catalyst is reactivated by the removal of these deposits. It has been found that the catalysts have different effects in the synthesis reaction when fresh or when newly regenerated catalysts are used, thus causing an undesirably high initial catalytic activity with the resultant high production of such compounds as carbon dioxide and methane and low production of the desired liquid products in the initial stages of the conversion. In addition, the production of these undesirable products is accompanied by the generation of large quantities of exothermic heat of reaction which, unless promptly removed, will result in carbonaceous deposits on and injury to the catalyst. It has been the prior practice to remove the excess heat during the initial stages of the reaction and to allow the conversion to proceed until the activity of the catalyst declines to such a degree that liquid products in the desired proportions are produced. This procedure is generally known as "breaking in" the catalyst, and it is with a modification of this stage of the process that the present invention is primarily concerned.

It is an object of the present invention to provide a process for the conversion of carbon monoxide-hydrogen mixtures to hydrocarbons and their corresponding oxygenated derivatives in which fresh or newly regenerated catalysts are used and in which the initial activity of these catalysts is modified in a novel and effective manner.

It is a further object of this invention to carry out such a process in a manner that the initial activity of the catalyst is modified while avoiding the undesirable production of carbon dioxide and methane and the generation of excessive heat.

In accordance with my invention the synthesis process is begun by contacting a gaseous reaction mixture of hydrogen and carbon monoxide with a suitable catalyst at the desired reaction temperature and at a pressure and a space velocity of gaseous reactants substantially lower than the pressure and space velocities normally used to effect the synthesis reaction. The pressure and space velocity are gradually increased as the initial high activity of the catalyst decreases in such a manner that reaction pressure and space velocity are reached after the catalyst has become completely conditioned and has lost its undesirably high activity. Thus, a means is provided for maintaining a low synthesis reaction rate when the catalyst activity is high and the reaction rate is gradually increased as the catalyst is put into synthesis operation and becomes conditioned.

I will describe my invention in greater detail hereinbelow by referring to the accompanying diagrammatic drawing. Such conventional equipment as pumps, compressors, etc. has not been included in this drawing in order to facilitate the understanding of my invention, but the inclusion of such conventional equipment is not beyond the purview of my invention.

The present invention is applicable to all the conventional types of Fischer-Tropsch catalysts including those containing iron, cobalt or nickel. Recently it has been found that throughputs and, consequently, production rates in the Fischer-Tropsch process can be greatly increased by the use of a finely divided iron catalyst prepared by the reduction of iron oxide. These catalysts are used in a turbulent or fluidized state in the synthesis gas in either continuous or fluidized fixed bed operations. Iron catalysts of this type may be prepared by fusing iron oxide, grinding to a desired particle size, say 60 to 250 mesh, and reducing with hydrogen at about 500° C. Promoters such as alkali metal oxides, alumina or calcium oxide are advantageously incorporated in the catalyst. My invention has been found to be particularly advantageous in the breaking in of finely divided iron catalysts such as those described above. The term "fresh catalyst" as used herein is intended to apply to new catalysts not previously used as well as newly or freshly reactivated catalysts which have previously been spent in the reaction and then reactivated by a suitable treatment.

Reaction temperatures, pressures and space velocities will depend on the catalyst employed. For cobalt-containing catalysts the temperature is usually within the range of 180 to 220° C; for nickel-containing catalysts, the temperature range is from 170 to 200° C; and for iron catalysts used in fixed bed operations the temperature range is from 220 to 320° C. For fluidized iron catalysts the reaction temperature may be somewhat higher and within the range of 295 to 340° C, the preferable operating temperature being about 320° C. The synthesis reaction is ordinarily carried out at atmospheric or medium pressures depending on the products desired and the catalysts used. A preferred range of pressures suitable for the reaction is from 5 to 15 atmospheres, but pressures up to 150 atmospheres and higher may be used. When pressures of 400 p. s. i. and higher are used with a fluidized iron catalyst the reaction product has been found to contain more oxygenated compounds than when lower reaction pressures are used. The space velocities normally employed for cobalt-containing and nickel-containing stationary catalysts are within the range of 50 to 200, preferably 100, volumes of synthesis gas per volume of catalyst per hour. With a fixed bed iron catalyst, the space velocity may be as high as 150 to 300. When using fluidized iron catalysts considerably higher space velocities are used, generally within the range of 1000 to 3500 or higher.

The pressure and space velocity at which I prefer to initiate the conditioning of the catalyst depends upon the catalyst that is used for the synthesis reaction. Generally, for all catalysts the pressure and space velocity for initiating the conditioning step is substantially below the reaction pressure and space velocity. I ordinarily prefer to start with atmospheric pressure, but if desired, lower pressures and pressures not above 5 atmospheres may be used. With cobalt-containing and nickel-containing catalysts, the starting space velocity will be within the range of 10 to 25 volumes of synthesis gas per volume of catalyst per hour. With a fixed bed iron catalyst the starting space velocity may be slightly higher but not above 75 volumes of synthesis gas per volume of catalyst per hour. When using a fluidized iron catalyst, I use a space velocity which is at least sufficient to produce fluidization of the catalyst in the reaction zone, but lower space velocities may be used, if desired. The preferred space velocity is within the range of 300 to 500 volumes of synthesis gas per volume of catalyst per hour, but higher and lower space velocities may be used without departing from my invention.

The period of time required to effect proper conditioning of the catalyst in accordance with my invention and to increase the pressure and space velocity from their initial values to conditions suitable for the synthesis reaction is at least 5 hours. Generally, the period of time will be within the range of 5 to 15 hours, and preferably 8 hours. It is also desirable, but not essential, that the pressure and space velocity reach values suitable for the synthesis reaction simultaneously. If the pressure and space velocity reach reaction conditions in a shorter period of time, the initial activity of the catalyst will be too high, and the catalyst will be improperly conditioned.

It is desirable and preferable to subject the catalysts to a "precarbiding" step prior to utilization of the catalyst in my process. This "precarbiding" step may involve contacting the catalyst with carbon monoxide before using the catalyst in my process, and it aids in reducing the tendency of the catalyst to promote the formation of undesired by-products such as methane, carbon dioxide, and wax when the catalyst is first introduced into the synthesis reaction. My invention is not intended to be a mere substitute for this "precarbiding" step, but it is to be used either in addition to or without the "precarbiding" step and serves as a means for completely conditioning the catalyst prior to use in the synthesis reaction. The "pre-carbiding" step may be conducted by contacting a reduced iron oxide catalyst, such as those described hereinabove, with a synthesis gas mixture of hydrogen and carbon monoxide at about 240° C., raising the temperature gradually to the synthesis reaction temperature over a period of about 9 hours, and continuing the contacting of the catalyst with the synthesis gas for about an hour at the synthesis reaction temperature.

Referring to Figure 1, which is a diagrammatic drawing of a conventional Fischer-Tropsch conversion unit, synthesis gas containing hydrogen and carbon monoxide is a molar ratio within the range of 1:1 to 3:1, preferably 1.8:1 to 2.2:1, and more preferably 2:1, enters reactor 4 via lines 1 and 2. Reactor 4 is charged with a freshly reduced iron catalyst 5, and it is provided with suitable cooling means, not shown, for removing excess exothermic heat of reaction. The catalyst has been prepared from iron oxide and promoted with potassium oxide, aluminum oxide and calcium oxide, and after grinding to 100 mesh size the catalyst is reduced at 500° C. with hydrogen. The catalyst is pre-treated or "pre-carbided" with synthesis gas for 10 hours at atmospheric pressure and a space velocity of 300 to 500 volumes of synthesis gas per volume of catalyst per hour, and during this period of 10 hours the temperature is increased from 240 to 300° C. The effluent from the reactor leaves reactor 4 via line 6, through condenser 7 and separator 8, and it is vented from the system via line 10. At the end of this "pre-carbiding" period and with the temperature remaining at 300° C. the synthesis operation is begun by recycling a portion of the effluent to reactor 4 via line 9 and valve 3, and the pressure in reactor 4 is gradually increased by limiting the quantity of tail gas withdrawn via line 10. The space velocity and reaction pressure are increased so that a space velocity of 3000 volumes of fresh synthesis gas per volume of settled catalyst per hour and a pressure of 400 p. s. i. is reached after 5 hours of operation. At the end of this conditioning period the catalyst has lost enough of its high initial activity that the synthesis reaction can now be carried out at normal operating conditions. The superficial linear velocity of the gas through the reactor is maintained at about 1 foot per second by suitable adjustment in recycle and fresh feed rates as the pressure and space velocity increase. During the synthesis operation reaction products including hydrocarbons and oxygenated hydrocarbon derivatives containing at least three carbon atoms per molecule are separated from the reaction effluent in separator 8, and they are withdrawn as products of the reaction via line 11. The remaining gaseous effluent or tail gas may be vented from from the system via line 10 or recycled to reactor 4, as required, via line 9 and valve 3.

From the above description of my invention numerous modifications will be obvious to those skilled in the art without going beyond the scope of my invention.

I claim:

1. In a process for the synthesis of organic compounds from carbon monoxide-hydrogen mixtures in which said mixtures are contacted with a finely divided fluidized catalyst having a high initial activity, the method of modifying such initial activty whch comprises contacting said catalyst for a period limited to from 5 to 15 hours with a synthesis gas comprising carbon monoxide and hydrogen at a synthesis reaction temperature within the range of between 180° C. and 340° C. based upon a particular catalyst utilized, at a pressure not over five atmospheres and a space velocity of said synthesis gas lower than that required to effect the synthesis reaction under the conditions used, and gradually increasing said pressure and space velocity as the initial activity of said catalyst decreases until a pressure and a space velocity are attained at which the synthesis reaction is effected.

2. In a process for the synthesis of hydrocarbons and oxygenated hydrocarbon derivatives from a carbon monoxide-hydrogen mixture in which said mixture is contacted with a finely-divided, fluidized iron catalyst, the method of modifying the initial activity of said catalyst which comprises contacting said catalyst with a synthesis gas comprising carbon monoxide and hydrogen at a temperature within the range of 295 to 340° C. at a pressure not over 5 atmospheres and at a space velocity lower than the space velocity at which the synthesis reaction is effected and sufficiently great to maintain the catalyst in a fluidized condition, and gradually increasing said pressure and space velocity as the initial activity of said catalyst decreases until a pressure and a space velocity suitable for effecting the synthesis reaction are reached.

3. A method according to claim 2 wherein the catalyst is initially contacted with a synthesis gas at atmospheric pressure.

4. A method according to claim 2 wherein the initial space velocity is within the range of 300 to 500 volumes of fresh synthesis gas per volume of catalyst per hour.

5. A method according to claim 2 wherein the initial pressure and space velocity are gradually increased over a period of at least 5 hours.

6. A method according to claim 5 wherein the initial pressure and space velocity are gradually increased over a period of from 5 to 15 hours.

7. A method according to claim 5 wherein the pressure and space velocity become suitable for the synthesis reaction simultaneously.

8. A method for the conversion of carbon monoxide-hydrogen mixtures to form hydrocarbons and oxygenated hydrocarbon derivatives which comprises contacting a finely divided iron catalyst with a synthesis gas mixture comprising hydrogen and carbon monoxide at atmospheric pressure at a space velocity of 300 to 500 volumes of synthesis gas per volume of catalyst per hour for a period of at least 10 hours and gradually increasing the temperature from 240 to 300° C. during this period of time, gradually increasing said pressure and space velocity for a period of from 5 to 15 hours to a pressure and a space velocity suitable for effecting the conversion reaction, effecting the conversion reaction at the thus-attained reaction conditions and recovering reaction products containing at least 3 carbon atoms per molecule.

JOHN PAUL HOGAN.

References Cited in the file of this patent

UNITED STATES PATENTS

| Number | Name | Date |
|---|---|---|
| 2,231,990 | Dreyfus | Feb. 18, 1941 |
| 2,445,796 | Millendorf | July 27, 1948 |
| 2,449,071 | Hawk | Sept. 14, 1948 |
| 2,461,570 | Roberts | Feb. 15, 1949 |
| 2,489,451 | Dart et al. | Nov. 29, 1949 |